(12) United States Patent
Lim

(10) Patent No.: US 7,746,505 B2
(45) Date of Patent: Jun. 29, 2010

(54) IMAGE QUALITY IMPROVING APPARATUS AND METHOD USING DETECTED EDGES

(75) Inventor: Sung-Hyun Lim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 713 days.

(21) Appl. No.: 11/123,113

(22) Filed: May 6, 2005

(65) Prior Publication Data

US 2005/0249430 A1 Nov. 10, 2005

(30) Foreign Application Priority Data

May 7, 2004 (KR) .................. 10-2004-0032390

(51) Int. Cl.
*G06K 15/00* (2006.01)
*G06T 5/00* (2006.01)
*H04N 1/407* (2006.01)
*H04N 1/409* (2006.01)

(52) U.S. Cl. .................................. 358/3.27; 358/1.6
(58) Field of Classification Search .............. 358/3.27, 358/462, 1.6, 1.2, 1.11; 382/199, 266, 176
See application file for complete search history.

(56) References Cited

U.S. PATENT DOCUMENTS

| | | | |
|---|---|---|---|
| 5,442,459 | A | 8/1995 | Gahang |
| 6,608,942 | B1 * | 8/2003 | Le .................. 382/279 |
| 6,868,180 | B2 * | 3/2005 | Akahori et al. .............. 382/167 |
| 7,085,009 | B2 * | 8/2006 | Kawai et al. .................. 358/1.9 |
| 2003/0007076 | A1 * | 1/2003 | Okisu et al. ............... 348/222.1 |

FOREIGN PATENT DOCUMENTS

| | | |
|---|---|---|
| JP | 07-170420 | 7/1995 |
| JP | 07-212611 | 8/1995 |
| JP | 08-018812 | 1/1996 |
| JP | 08-275017 | 10/1996 |
| JP | 10-042152 | 2/1998 |
| JP | 10-257326 | 9/1998 |
| JP | 10-257327 | 9/1998 |

(Continued)

OTHER PUBLICATIONS

Fisher et al., Logical AND/NAND, 1994, Hypermedia Image Processing Reference, University of Edinburgh.*

(Continued)

*Primary Examiner*—Douglas Q Tran
(74) *Attorney, Agent, or Firm*—Staas & Halsey LLP

(57) ABSTRACT

An image quality improving apparatus and method that distinguish an edge of an actual outline imagely recognized in an image inputted via an image input unit from those printed according to dither patterns, to emphasize the actual outline, and thereby acquire the image without distortion. The image quality improving apparatus comprises: a first unit estimating edge pixels of a text area in a predetermined detection area to be edge-detected from an input picture data containing a text and an image; and a second unit judging actual edge pixels based upon a number of edge-estimated pixels in a multiple window area and saturation values of individual edge-estimated pixels, and emphasizing individual actual edge pixels with different edge emphasis coefficients according to saturation values of the actual edge pixels.

24 Claims, 11 Drawing Sheets

FOREIGN PATENT DOCUMENTS

| | | |
|---|---|---|
| JP | 2000-206756 | 7/2000 |
| JP | 2000-357237 | 12/2000 |
| KR | 1993-0005458 | 3/1993 |
| KR | 1020020059531 A1 | 7/2002 |

OTHER PUBLICATIONS

U.S. Appl. No. 11/032,199, filed Jan. 11, 2005, Sung-Hyun Lim, Samsung Electronics Co., Ltd.

Non-final Office Action issued by U.S.P.T.O. on Nov. 27, 2007 in co-pending U.S. Appl. No. 11/032,199.

Final Office Action issued by U.S.P.T.O. on Jun. 13, 2008 in co-pending U.S. Appl. No. 11/032,199.

Advisory Action issued by U.S.P.T.O. on Sep. 18, 2008 in co-pending U.S. Appl. No. 11/032,199.

Interview Summary issued by U.S.P.T.O. on Sep. 26, 2008 in co-pending U.S. Appl. No. 11/032,199.

Non-final Office Action issued by U.S.P.T.O. on Jan. 2, 2009 in co-pending U.S. Appl. No. 11/032,199.

Interview Summary issued by U.S.P.T.O. on Feb. 17, 2009 in co-pending U.S. Appl. No. 11/032,199.

* cited by examiner

FIG. 2A

|   |   |   |   |   |
|---|---|---|---|---|
| 0 |   | 0 |   | 0 |
|   |   |   |   |   |
| 0 |   | X |   | 0 |
|   |   |   |   |   |
| 0 |   | 0 |   | 0 |

FIG. 2B

|   |   |   |   |   |   |   |
|---|---|---|---|---|---|---|
| 0 |   |   | 0 |   |   | 0 |
|   |   |   |   |   |   |   |
| 0 |   |   | X |   |   | 0 |
|   |   |   |   |   |   |   |
| 0 |   |   | 0 |   |   | 0 |

FIG. 2C

|   |   |   |   |   |   |   |   |   |
|---|---|---|---|---|---|---|---|---|
| 0 |   |   |   | 0 |   |   |   | 0 |
|   |   |   |   |   |   |   |   |   |
| 0 |   |   |   | X |   |   |   | 0 |
|   |   |   |   |   |   |   |   |   |
| 0 |   |   |   | 0 |   |   |   | 0 |

FIG. 2D

|   |   |   |
|---|---|---|
| 0 | 0 | 0 |
| 0 | X | 0 |
| 0 | 0 | 0 |

FIG. 3A

| 255 | 250 | 216 | 161 | 120 |
|---|---|---|---|---|
| 245 | 207 | 157 | 121 | 119 |
| 251 | 217 | 118 | 125 | 152 |
| 170 | 130 | 139 | 174 | 208 |
| 152 | 152 | 197 | 229 | 248 |

FIG. 3B

| 255 | 216 | 120 |
|---|---|---|
| 251 | 118 | 152 |
| 152 | 197 | 248 |

FIG. 3C

| 0 | 0 | 1 |
|---|---|---|
| 0 | 1 | 1 |
| 1 | 0 | 0 |

FIG. 3D

| 0 | 0 | 1 |
|---|---|---|
| 0 | 1 | 1 |
| 1 | 1 | 0 |

FIG. 4A

| 165 | 162 | 162 | 159 | 168 |
|---|---|---|---|---|
| 131 | 158 | 178 | 190 | 179 |
| 117 | 149 | 187 | 192 | 180 |
| 131 | 161 | 175 | 168 | 179 |
| 151 | 158 | 144 | 141 | 162 |

FIG. 4B

| 165 | 162 | 168 |
|---|---|---|
| 117 | 187 | 180 |
| 151 | 144 | 162 |

FIG. 4C

| 0 | 0 | 0 |
|---|---|---|
| 1 | 0 | 0 |
| 1 | 1 | 0 |

FIG. 4D

| 0 | 1 | 0 |
|---|---|---|
| 1 | 0 | 0 |
| 1 | 1 | 1 |

| 197 | 184 | 166 | 150 | 125 | 98 | 87 | 98 | 101 |
|---|---|---|---|---|---|---|---|---|
| 174 | 155 | 129 | 108 | 89 | 90 | 89 | 112 | 135 |
| 159 | 123 | 106 | 91 | 84 | 91 | 123 | 144 | 173 |
| 131 | 111 | 96 | 101 | 117 | 132 | 162 | 177 | 195 |
| 108 | 111 | 116 | 132 | 150 | 168 | 188 | 202 | 205 |

| 166 | 125 | 87 |
|---|---|---|
| 106 | 84 | 123 |
| 116 | 150 | 188 |

| 184 | 125 | 98 |
|---|---|---|
| 123 | 84 | 144 |
| 111 | 150 | 202 |

FIG. 5E

| 197 | 125 | 101 |
|-----|-----|-----|
| 159 | 84  | 173 |
| 108 | 150 | 205 |

FIG. 5F

| 0 | 0 | 1 |
|---|---|---|
| 1 | 1 | 1 |
| 1 | 0 | 0 |

FIG. 5G

| 0 | 1 | 1 |
|---|---|---|
| 1 | 1 | 0 |
| 1 | 0 | 0 |

FIG. 5H

| 0 | 1 | 1 |
|---|---|---|
| 0 | 1 | 0 |
| 1 | 1 | 0 |

| 167 | 169 | 184 | 197 | 203 | 193 | 182 | 169 | 160 |
|---|---|---|---|---|---|---|---|---|
| 198 | 193 | 188 | 175 | 160 | 157 | 168 | 183 | 187 |
| 204 | 200 | 184 | 151 | 124 | 124 | 147 | 180 | 185 |
| 204 | 200 | 188 | 152 | 130 | 123 | 150 | 184 | 188 |
| 196 | 201 | 199 | 178 | 155 | 151 | 170 | 187 | 193 |

| 184 | 203 | 182 |
|---|---|---|
| 184 | 124 | 147 |
| 199 | 155 | 170 |

| 169 | 203 | 169 |
|---|---|---|
| 200 | 124 | 180 |
| 201 | 155 | 187 |

FIG. 6E

| 167 | 203 | 160 |
|---|---|---|
| 204 | 124 | 185 |
| 196 | 155 | 193 |

FIG. 6F

| 0 | 0 | 1 |
|---|---|---|
| 1 | 1 | 1 |
| 0 | 1 | 1 |

FIG. 6G

| 1 | 0 | 1 |
|---|---|---|
| 0 | 1 | 1 |
| 0 | 1 | 0 |

FIG. 6H

| 1 | 0 | 1 |
|---|---|---|
| 0 | 1 | 1 |
| 0 | 1 | 0 |

FIG. 7A

| $a_{11}$ | $a_{12}$ | $a_{13}$ |
|---|---|---|
| $a_{21}$ | $a_{22}$ | $a_{23}$ |
| $a_{31}$ | $a_{32}$ | $a_{33}$ |

FIG. 7B

| $b_{11}$ | $b_{12}$ | $b_{13}$ |
|---|---|---|
| $b_{21}$ | $b_{22}$ | $b_{23}$ |
| $b_{31}$ | $b_{32}$ | $b_{33}$ |

FIG. 7C

| $c_{11}$ | $c_{12}$ | $c_{13}$ |
|---|---|---|
| $c_{21}$ | $c_{22}$ | $c_{23}$ |
| $c_{31}$ | $c_{32}$ | $c_{33}$ |

| E | E | N |
|---|---|---|
| E | E | E |
| E | N | E |

| E | N | N |
|---|---|---|
| E | N | E |
| N | E | E |

IMAGE QUALITY IMPROVING APPARATUS AND METHOD USING DETECTED EDGES

CROSS-REFERENCE TO RELATED APPLICATIONS

This application claims the benefit of Korean Application No. 2004-32390, filed May 7, 2004, in the Korean Intellectual Property Office, the disclosure of which is incorporated herein by reference.

BACKGROUND OF THE INVENTION

1. Field of the Invention

The present invention relates to an image quality improving apparatus and method, and more particularly, an image quality improving apparatus and method that can distinguish an edge of an actual outline imagery recognized in an image inputted via an image input unit from those printed according to dither patterns to emphasize the actual outline, and thereby acquire the image without distortion.

2. Description of the Related Art

An image quality improving apparatus serves to convert an image into a form that can be easily seen by the human. An example of such an image improving apparatus and method is disclosed from Korean Patent Application Publication No. 10-2002-59531, entitled "Apparatus and Method of Improving Printing Quality in Documents Containing a Mixture of Text and Image."

The apparatus and method disclosed by the above document will be described in brief as follows.

First, the apparatus according to the above document may generally include a detecting section and an emphasizing section.

From pixels in an output picture containing a mixture of a text and an image, the detecting section detects pixels corresponding to an outline and to the text.

The emphasizing section adjusts the lightness of the pixels detected by the detecting section to emphasize the output of the detected pixels. Herein, values multiplied with weights are added to the lightness values of those pixels surrounding a target pixel, and it is judged whether the resultant values exceed a predetermined reference value, to judge whether the target pixel corresponds to the outline based upon the result of judgment.

Also, to determine whether a specific pixel is a text, those pixels surrounding the specific pixel are grouped according to their lightness differences, and it is judged whether the number of groups is smaller than a reference number.

As a consequence, only those pixels corresponding to the outline of the text are emphasized to execute differentiated emphasis conforming to characteristics of the text and the image to thereby improve the quality of the output document.

But this solution has a limited capability in reflecting characteristics around the specific or target pixel, since it only uses a single window in calculation of a connected component number N of the pixels. As a result, in a document printed via a low Line Per Inch (LPI) condition, such as a newspaper in which characteristics around a target pixel are similar to a letter, there are problems in that edge detection precision is poor, or a large quantity of memory and complex calculation are required.

According to a conventional technique, binary data are extracted through comparison with a mean value of a single window mask to calculate connected components in order to sort edge pixels based upon the connected components. But if a printed object wanted by a user is obtained in a dither pattern, the printed object is printed differently, according to the application of frequency characteristics with respect to the dither pattern. Accordingly, if a single mask is used, there is a problem in that this technique can rarely correspond to various frequency patterns.

For example, in case of a halftone having a low frequency, a text is hardly distinguishable from an image at a small window size. Even if the printed object is obtained at a large window size in a halftone pattern of an equal frequency, an edge is not easily distinguished since the degree of variation is different according to pixel position.

In a case of extracting binary data through comparison with the mask mean value, the number of those, which are judged 1, from total 9 pixels is different according to masks. Even if the patterns are the same, the variation of value results in different values of connected components, and thus it is difficult to realize a desired object.

Further, since binary data are processed based upon a mean value within a window mask, the number of pixels having a binary data value of 1 is not constant. Therefore, if an edge is formed diagonally, the probability of erroneous sorting between a text edge and a halftone image edge disadvantageously increases.

SUMMARY OF THE INVENTION

It is, therefore, an aspect of the present invention to provide an image quality improving apparatus and method that detect an edge, which is a non image boundary, appearing in an image area of a printing object produced through a dither pattern from a picture inputted via a image input unit, to prevent image quality degradation induced from a high frequency filter, while emphasizing boundaries of a text or a thin line without any loss to acquire a final picture of improved quality.

According to an aspect of the invention for realizing the above aspects, there is provided an image quality improving apparatus comprising: a first unit estimating edge pixels of a text area in a predetermined detection area to be edge-detected from an input picture data containing a text and an image; and a second unit judging actual edge pixels based upon a number of edge-estimated pixels in a multiple window area and saturation values of individual edge-estimated pixels, and emphasizing individual actual edge pixels with different edge emphasis coefficients according to saturation values of the respective actual edge pixels.

According to one aspect, the first unit comprises: a lightness variation measuring section measuring lightness variation from individual pixels in the predetermined detection area to be edge-detected; and an edge estimating section calculating binary data of the individual pixels according to multiple windows, the binary data being composed by the lightness variation measuring section according to different sampling procedures from an area having lightness variation, the edge estimating section also judging connectedness and similarity of the calculated binary data according to the individual windows, to estimate whether a given pixel is an edge.

According to one aspect, the edge estimating section estimates a given pixel as a non-edge if the lightness variation is greater than or equal to a predetermined lightness variation reference value, connected component values of the binary data do not have connectedness, or windows do not have similarity.

According to one aspect, the second unit comprises: an edge detecting section performing a first comparison, comprising comparing the saturation values of the individual edge-estimated pixels of multiple windows and the number of the edge-estimated pixels with a predetermined reference saturation value and a reference estimation number, respectively, to judge whether the edge-estimated pixels are actual edge pixels or not, based upon a result of the first comparison; and an edge emphasizing section performing a second comparison, comprising comparing the saturation values of the actual edge pixels with the predetermined reference saturation value to execute edge emphasis to the individual pixels using different edge emphasis coefficients according to a result of the second comparison.

According to one aspect, the edge detecting section judges the edge-estimated pixels as actual edge pixels if the saturation values of the individual edge-estimate pixels are larger than the predetermined reference saturation value and the number of the edge-estimated pixels is larger than a predetermined first reference edge number, and judges the edge-estimate pixels as not being actual edge pixels if the saturation values of the individual edge-estimate pixels are smaller than or equal to the predetermined reference saturation value and the number of the edge-estimated pixels is smaller than or equal to the predetermined first reference edge number.

According to the one aspect, a first pixel edge emphasis coefficient is applied to a given actual edge pixel when the saturation value of the given actual edge pixel is larger than the predetermined reference saturation value; a second pixel edge emphasis coefficient is applied to given actual edge pixel when the saturation value of the given actual edge pixel is smaller than the predetermined reference saturation value; and the second pixel edge emphasis coefficient is larger than the first pixel edge emphasis coefficient.

According to another aspect of the invention, there is provided an image quality improving method comprising the operations: estimating edge pixels of a text area in a predetermined detection area to be edge-detected from an input picture data containing a text and an image; judging actual edge pixels based upon a number of edge-estimated pixels in a multiple window area and saturation values of individual edge-estimated pixels; and emphasizing individual actual edge pixels with different edge emphasis coefficients according to saturation values of the actual edge pixels.

According to one aspect, the edge pixel estimating operation comprises: measuring lightness variation from individual pixels in the predetermined detection area to be edge-detected; and calculating binary data of the individual pixels according to multiple windows, the binary data being composed according to different sampling procedures from an area having lightness variation, and judging connectedness and similarity of the calculated binary data according to the individual windows, to estimate whether a given pixel is an edge.

According to one aspect, the edge pixel estimating operation estimates a given pixel as a non-edge if the lightness variation is greater than or equal to a predetermined reference value, connected component values of the binary data do not have connectedness, or the windows do not have similarity.

According to one aspect, the edge emphasizing operation comprises: in a first comparison, comparing the saturation values of the individual edge-estimated pixels of multiple windows and the number of the edge-estimated pixels with a predetermined reference saturation value and a reference estimation number, respectively, to judge whether the edge-estimated pixels are the actual edge pixels or not, based upon a result of the first comparison; and in a second comparison, comparing the saturation values of the actual edge pixels with the predetermined reference saturation value to emphasize the individual actual edge pixels with different edge emphasis coefficients according to a result of the second comparison.

According to one aspect, the actual pixel judging operation comprises: judging the edge-estimated pixels as the actual edge pixels if the saturation values of the individual edge-estimate pixels are larger than the predetermined reference saturation value and the number of the edge-estimated pixels is larger than a predetermined first reference edge number; and judging the edge-estimate pixels as not being actual edge pixels if the saturation values of the individual edge-estimate pixels are smaller than or equal to the predetermined reference saturation value and the number of the edge-estimated pixels is smaller than the predetermined first reference edge number.

According to one aspect, the edge emphasizing operation further comprises: emphasizing a given actual edge pixel with a first edge emphasis coefficient if the saturation value of the given edge pixel is larger than the predetermined reference saturation value; and emphasizing a given actual edge pixel with a second edge emphasis coefficient if the saturation value of the given actual edge pixel is smaller than or equal to the predetermined reference saturation value, wherein the first edge emphasis coefficient is smaller than the second edge emphasis coefficient.

Additional aspects and/or advantages of the invention will be set forth in part in the description which follows, and in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which:

FIGS. 2A to 2D are views illustrating an exemplary method of extracting dictionary data for calculating connected components in multiple windows;

FIGS. 3A to 3D are views illustrating an exemplary method of extracting binary data for calculating connected components in a text area;

FIGS. 4A to 4D are views illustrating an exemplary method of extracting binary data for calculating connected components in an image area;

FIGS. 5A to 5H are views illustrating an exemplary method of extracting binary data from multiple windows in a text area;

FIGS. 6A to 6H are views illustrating an exemplary method of extracting binary data from multiple windows in an image area;

FIGS. 7A to 7C are views illustrating an exemplary method of determining the similarity of binary data connected components in multiple windows;

DETAILED DESCRIPTION OF THE PREFERRED EMBODIMENTS

Figure 1:
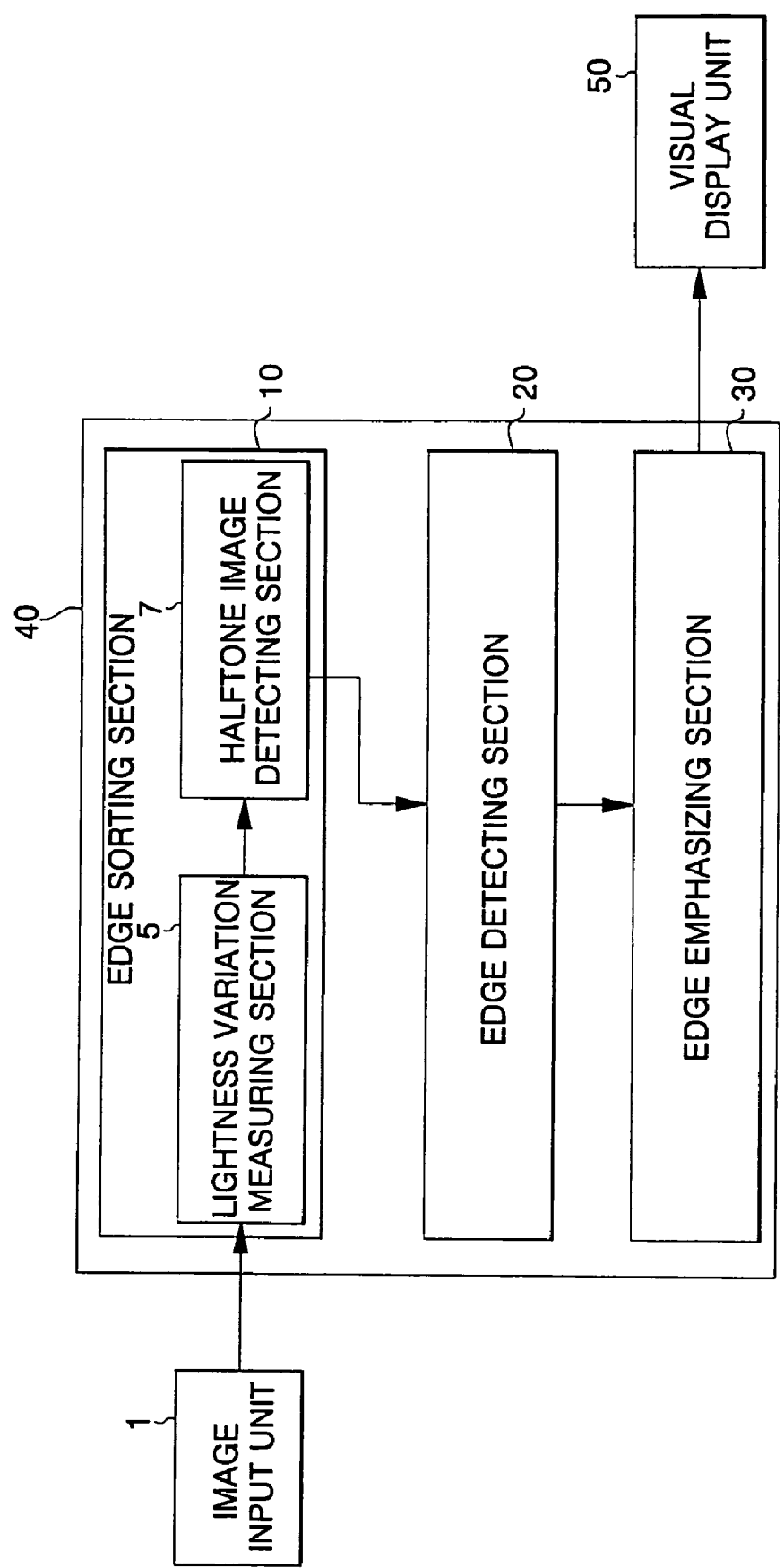
FIG. 1 is a block diagram illustrating an apparatus to improve image quality according to an embodiment of the invention.

Reference will now be made in detail to embodiments of the present invention, examples of which are illustrated in the accompanying drawings, wherein like reference numerals refer to the like elements throughout. The embodiments are described to explain the present invention by referring to the figures.

FIG. 1 is a block diagram illustrating an apparatus of improving image quality according to an embodiment of the invention.

As is shown in FIG. 1, an image quality improving apparatus 40 includes an edge sorting section 10, an edge detecting section 20 and an edge emphasizing section 30. The edge sorting section 10 includes a lightness variation measuring section 5 and a halftone image detecting section 7.

With the above construction, the image quality improving apparatus 40 serves to detect and emphasize an edge of an image inputted via an image input unit 1, and provides the emphasized image to a image display unit 50. Examples of the image input unit 1 include a PC, a scanner, and so on, and examples of the image display unit 50 include a printer, a copying machine, a facsimile, and so on.

The lightness variation measuring section 5 of the edge sorting section 10 measures a lightness variation from neighboring pixels neighboring a target pixel, to sort edge pixels of an input picture.

If the lightness variation around the target pixel is under a predetermined reference value, it is judged that the neighboring pixels are a non-edge. For example, where a document is scanned with a high resolution scanner of 300 DPI or more, lightness variation is detected at a specific Line Per Inch (LPI) unique to the document in an image area having a constant lightness. This acts as a sort of noise, and also functions as a factor of severe image degradation when edge pixels are emphasized. Herein, those areas having such noises will be referred to as halftone image areas.

The lightness variation measuring section 5 takes those pixels having lightness variation that are at least a predetermined level as edge candidates. Policies for measuring lightness variation include Sobel Operator, Laplacian Operator, maximum-minimum difference in a corresponding window, and so on. An embodiment of the invention will be described based upon the policy using the difference of maximum and minimum lightness. That is, if a difference between minimum and maximum lightness values is smaller than a predetermined reference value, a corresponding pixel is sorted as a non-edge.

The halftone image detecting section 7 of the edge sorting section 10 detects halftone images of pixels that are sorted as an edge by the lightness variation measuring section 5 according to measured lightness values, to distinguish an actual edge such as a text boundary from an image edge in a halftone area.

Such a method of distinguishing an actual edge such as a text boundary from an image edge in a halftone area first uses multi-sized windows and fixed order level reference values to measure connected components of binary data of the multiple windows, and second, measures a variation of the binary data of the multiple windows to determine a similarity of pixels.

As a result of the above measurement, if it is determined that the respective binary data of the multiple window areas have any connected component and similarity, a corresponding pixel is estimated as an edge. The method of measuring connected components and similarity will be described in detail later in the specification.

Upon receiving a pixel that is estimated as an edge from the edge sorting section 10, the edge detecting section 20 detects an edge which is to be finally emphasized. That is, the edge detecting section 20 executes erosion and dilation procedures to remove a pixel sorted as an edge in a halftone image area and compensate a pixel which is excluded from an actual edge area such as a text.

Further, saturation information of a pixel is used by the edge detecting section 20 to finally detect an edge. That is, to finally detect an edge, saturation values of individual pixels in a detection area are compared with a predetermined saturation reference value, and a reference number of pixels sorted as a different edge is applied.

The edge emphasizing section 30 applies an edge emphasizing filter, such as Unshaping Masking, to a pixel to output its result via the image display unit 50 if finally detected as an edge by the edge detecting section 20, but outputs a pixel without emphasis via the image display unit 50 if the pixel is detected as a non-edge.

An operation of the image quality improving apparatus as described above will be described in detail with reference to the accompanying drawings.

First, as is shown in FIG. 1, the lightness variation detecting section 5 of the edge sorting section 10 sorts edge pixels based upon gradient, that is, measures lightness variation from pixels neighboring a target pixel to sort the edge pixels.

As a result of the lightness variation measurement, if the lightness value of a pixel neighboring the target pixel meets or exceeds the predetermined reference value, the pixel is estimated as a candidate edge. But, if the lightness value of the pixel neighboring the target pixel is under the predetermined reference value, the pixel is excluded from the candidate edge.

The method of measuring lightness variation from pixels may adopt various policies or techniques, for example, Sobel Operator, Laplacian Operator, maximum-minimum difference in a corresponding window, and so on.

A preferred embodiment of the invention uses the policy based upon the maximum-minimum difference in a corresponding window to measure lightness variation from pixels.

That is, after a suitable reference value is preset, difference values between maximum and minimum lightness values of individual pixels are compared with the predetermined reference value to determine whether the individual pixels have any lightness variation.

If the difference between the maximum and minimum lightness values of an individual pixel is larger than the reference value, it is estimated that there is lightness variation in the pixel. Otherwise, it is estimated that there is no lightness variation in the pixel.

According to the lightness variation in the pixel measured by the lightness variation measuring section 5 of the edge sorting section 10, the halftone image detecting section 7 of the edge sorting section 10 generates binary data to calculate the connected component between pixels.

That is, the halftone image detecting section 7 distinguishes an actual edge, such as a text boundary, from an image edge in a halftone area.

First, the halftone image detecting section 7 measures connected components by using multi-sized windows and fixed order level reference values.

According to one embodiment, the invention sets a fixed order level (embodiment 5) in place of the mean value for a comparison reference value in generation of the multiple windows and the binary masks thereby to overcome problems of extracting binary data.

Hereinafter a method of calculating binary data and connected component values for individual pixels will be described with reference to the accompanying drawings.

FIGS. 2A to 2C are views illustrating an exemplary method of extracting dictionary data to calculate connected components in multiple windows.

FIGS. 2A to 2C illustrate sampled pixels in 5×5, 5×7, and 5×9 windows around a target pixel (designated with "X"). It is judged whether or not the target pixel is an edge. FIG. 2D illustrates a 3×3 window in which neighboring pixels (8 pixels, designated with "0") around the pixels "X" are sampled from FIGS. 2A to 2C.

FIGS. 3A to 3D are views illustrating an exemplary method of extracting binary data to calculate connected components extracted from the 5×5 window mask, in which FIG. 3A illustrates lightness values for individual pixels of the 5×5 window mask in a text area, FIG. 3B illustrates a 3×3 window mask sampled from the window mask in FIG. 3A, FIG. 3C illustrates resultant binary data extracted from the sampled window mask in FIG. 3B by setting a reference value to a mean value, for example, approximately 190, and FIG. 3D illustrates resultant binary data extracted from the sampled window mask in FIG. 3B by setting the reference value to a fixed lightness order, for example, the $5^{th}$ value when the nine lightness values are listed in numerical order, which in this example is 197.

As is shown in FIGS. 3A to 3D, a binary data value is extracted as "1" if the lightness value of a pixel in a corresponding position is smaller than the reference value, but as "0" if the lightness value is larger than the reference value.

Where 4 connected components are used for a pixel having a binary data value of "1", if the reference value is set to the mean value as in FIG. 3C, the connected component value N is 2. As in FIG. 3D, if the reference value is set to the value of a pixel in the 5 th order of 9 pixels, the connected component value becomes "1." Herein the fixed order may be set different.

If the connected component value N is "2", this means complete exclusion from edge sorting. If the connected component value N is "1", the extraction of binary data will be repeated with respect to a different window size.

That is, if the mean value is set as the reference value, as in FIG. 3C, the connected component value N becomes "2" so that a corresponding pixel is sorted a non-edge. If the connected component value N is "1", as in FIG. 3D, the next operation will be executed.

FIGS. 4A to 4D are views illustrating an exemplary method of extracting binary data to calculate connected components in an image area, with the connected components being extracted from a 5×5 window mask in a text area, in which FIG. 4A illustrates lightness values for individual pixels of the 5×5 window mask in a text area, and FIG. 4B illustrates a 3×3 window mask sampled from the window mask in FIG. 4A. FIG. 4C illustrates resultant binary data extracted from the sampled window in FIG. 4B by setting a reference value to a mean value, for example, approximately 160. FIG. 4D illustrates resultant binary data extracted from the sampled window mask in FIG. 4B by setting the reference value to a fixed lightness order for example, the $5^{th}$ value when the nine lightness values are listed in numerical order, which in this example is 162.

As is shown in FIGS. 4A to 4D, in an image area which is not an original boundary but appears to be an edge in an original copy because of printing characteristics, a lightness value varies frequently. It is preferred that the connected component value N does not become "1" or a corresponding pixel is not sorted as an edge. In FIG. 4C, the calculated 4 connected component value becomes "1", and there is a possibility that a corresponding pixel can be sorted as an edge.

However, in FIG. 4D, the calculated connected component value becomes "2", and thus a corresponding pixel is not considered as an edge at all.

In an actual edge such as the text boundary, if the fixed order level is set as the reference value, the binary data value tends to be connected with a pixel having a binary data value of "1" as in FIG. 3D to provide a high probability of judging a corresponding pixel as an edge. In case of an edge which is not imagely noticeable, this edge may not be sorted as an edge since the connection of a pixel having a binary data value of "1" (which is rather dark) tends to be broken.

As a result, when the fixed order level is set as the reference value, it is possible to reduce the probability of erroneous sorting both in an actual edge and an image area.

Hereinafter binary data and connected component value extraction from multiple windows in text and image areas will be described in more detail with reference to FIGS. 5A to 5H and FIGS. 6A to 6H.

Figures 5A, 5B, 5C, 5D:
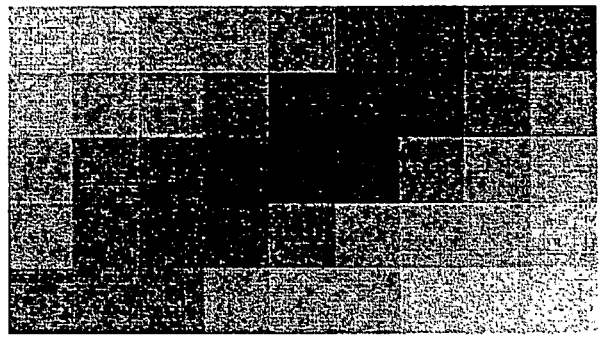

FIG. 5A is a picture expressing the lightness of pixels in a 5×9 window in a text area, FIG. 5B illustrates lightness values of pixels in the 5×9 window in the text area.

FIG. 5C illustrates a 3×3 window mask which is produced through a 5×5 window mask sampling procedure from the 5×9 window mask in FIG. 5B. Herein the 5×5 window mask sampling procedure samples pixels from 1 st, 3 rd, and 5 th columns in 1 st, 3 rd, and 5 th rows, respectively, when generating a 5×5 window mask based upon a central pixel of the 5×9 window mask.

FIG. 5D illustrates a 3×3 window mask which is produced through a 5×7 window mask sampling procedure from the 5×9 window mask shown in FIG. 5B. Herein the 5×7 window mask sampling procedure samples pixels from 1 st, 4 th and 7 th columns in 1 st, 3 rd, and 5 th rows, respectively, when generating a 5×7 window mask based upon a central pixel of the 5×9 window mask.

FIG. 5E illustrates a 3×3 window mask which is produced through a 5×9 window mask sampling procedure from the 5×9 window mask in FIG. 5B. Herein the 5×9 window mask sampling procedure samples pixels from 1 st, 5 th and 9 th columns in 1 st, 3 rd, and 5 th rows, respectively, when generating a 5×9 window mask based upon a central pixel of the 5×9 window mask.

Throughout FIGS. 5B to 5E, numbers in the individual pixels designate lightness values, and the individual pixels are brighter in proportion to the lightness values.

Figures 6A, 6B, 6C, 6D:
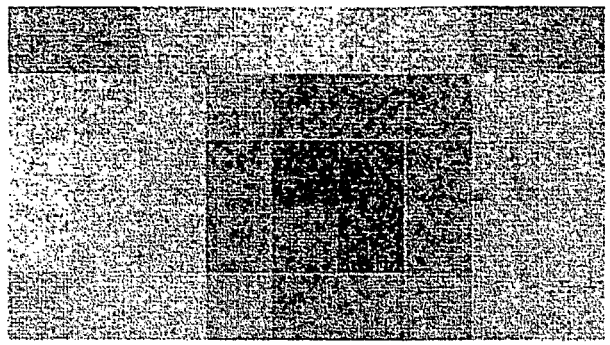

In the meantime, FIG. 6A is a picture expressing the lightness of pixels in a 5×9 window in a halftone image area, FIG. 6B illustrates the 5×9 window which is expressed with lightness values in the halftone image area.

FIG. 6C illustrates a 3×3 window mask, which is produced through a 5×5 window mask sampling procedure from the 5×9 window mask shown in FIG. 6B. FIG. 6D illustrates a 3×3 window mask that is produced through a 5×7 window mask sampling procedure from the 5×9 window mask shown in FIG. 6B. And FIG. 6E illustrates a 3×3 window mask which is produced through a 5×9 window mask sampling procedure from the 5×9 window mask shown in FIG. 6B.

In the text and halftone image areas shown in FIGS. 5A to 5H and 6A to 6H, the binary data values of the individual pixels are calculated as a result of comparing the lightness values of the individual pixels with a reference value.

That is, if the lightness values of the individual pixels are smaller than the reference value, a binary data "1" is calculated. If the lightness values of the individual pixels are larger than the reference value, a binary data "0" is calculated.

For example, in FIG. 5C, the reference value becomes "124" that is larger than a lightness value "123" and smaller than a lightness value "125." In FIG. 5D, the reference value becomes larger than "125" and smaller than "144." In FIG. 5E, the reference value becomes larger than "150" and smaller than "159."

In FIG. 6C, the reference value becomes "183" larger than a lightness value "182" and smaller than "184." In FIG. 6D, the reference value becomes larger than "180" and smaller than "187." In FIG. 6E, the reference value becomes larger than "185" and smaller than "193."

Accordingly, the lightness values of the individual pixels are compared with the reference values which are set in FIGS. 5C to 5E and FIGS. 6C to 6E, respectively, to produce binary data for the individual pixels as shown in FIGS. 5F to 5H and FIGS. 6F to 6H.

That is, FIGS. 5F to 5H and FIGS. 6F to 6H illustrate 3×3 window masks expressed with binary data, which are calculated from FIGS. 5C to 5E and FIGS. 6C to 6E, respectively.

When the binary data are calculated through the above process, if those pixels of the same binary value are continued, they are sorted into one group. The grouping is executed based upon only four directions including vertical and lateral directions without consideration of diagonal directions. That is, the binary data of a pixel is compared with that of a neighboring pixel in any of the four directions, and they are judged connected and grouped together only if their binary data are the same. The number of the grouped pixels will be referred to as the connected component value N.

Upon the completion of the grouping according to the binary data values, the connected component in the 3×3 window is calculated. In general, the connected component value is 1 in a text area, but at least 2 in a halftone image area.

In the text area, as can be seen from FIGS. 5F to 5H, the connected component value N is maintained "1" even if multiple windows are used.

In the halftone image area, as can be seen from FIGS. 6F to 6H, the connected component value N is changed according to the sampling masks. For example, in FIG. 6F, the connected component value N is "1" when the pixels sampled through the 5×5 window mask procedure are converted into binary numbers. In FIGS. 6G and 6H, the connected component value N is "2" when the pixels sampled through the 5×7 and 5×9 window mask procedures are converted into binary numbers, respectively.

Accordingly, it is apparent that the edge of the text area is not sensitive to the variation of the window size whereas the edge of the halftone image area is sensitive to the variation of the window size. As a result, using a plurality of windows or multiple windows can reduce the probability of erroneous edge sorting with respect to image pixels.

Based upon the individual connected component values N in the text and halftone areas calculated as above, the halftone image detecting section 7 shown in FIG. 1 judges the connectedness of the individual binary data of the multiple windows.

If all the connected component values N satisfy "1", it is judged that the individual binary data of the windows have connectedness. Otherwise, it is judged that they do not have connectedness. Herein if the individual pixels do not have connectedness, they are judged to be a non-edge, that is, they are not judged to be an edge.

For example, because the connected component values in FIGS. 5F to 5H are all "1", it is judged that the individual binary data of the multiple windows have mutual connectedness. On the contrary, because the connected component values in FIGS. 6F to 6H are not all "1", it is judged that the individual binary data of the multiple windows do not have mutual connectedness and the pixels are judged to be a non-edge.

Upon the judgment of the connectedness of the individual binary data of the multiple windows as above, if the binary data are judged to have mutual connectedness, the halftone image detecting section 7 of the edge sorting section 10 judges the mutual similarity of the binary data of the multiple windows.

A method of judging the mutual similarity of the binary data of the multiple windows is described as follows:

FIGS. 7A to 7C are views illustrating an exemplary method of determining the mutual similarity of binary data connected components in multiple windows.

Referring to FIG. 7 together with Equation 1 below, it is judged whether there is any mutual similarity in the binary data connected components in the multiple windows.

If it is judged that the mutual similarity exists in the binary data of the multiple windows, corresponding pixels are estimated as an edge. Otherwise, the corresponding pixels are estimated as a non-edge and excluded from candidates of the edge.

A method of judging whether the binary data values of the multiple windows have mutual similarity will use Equation 1 below:

$$\sum_{i=1}^{3}\sum_{j=1}^{3} a_{ij}b_{ij}c_{ij} \geq TH_a \qquad \text{Equation 1}$$

wherein $a_{ij}$, $b_{ij}$ and $c_{ij}$ are the binary data values of the individual pixels shown in FIG. 7, and $TH_a$ is a predetermined reference value.

Most text edge pixels such as boundaries have small positional change to "1", but halftone image edge pixels have large positional change to "1" and thus it is necessary to choose a suitable reference value $TH_a$.

If the binary data values of the individual pixels satisfy Equation 1 above, the individual data of the multiple windows are judged to have similarity and are estimated as an edge. Otherwise, the individual binary data of the multiple windows are judged to have no similarity and are estimated as a non-edge.

Upon setting the predetermined reference value THa as "3", if the individual data values of the multiple text areas shown in FIGS. 5F to 5H are applied to Equation 1 above, a resultant value of "3" is processed from Equation 1 above so that the corresponding pixels are estimated as an edge.

If the individual data values of the multiple halftone image areas shown in FIGS. 6F to 6H are applied to Equation 1 above, a resultant value of "2" is processed from Equation 1 above so that the corresponding pixels are estimated as a non-edge.

Figures 8A, 8B, 8C:
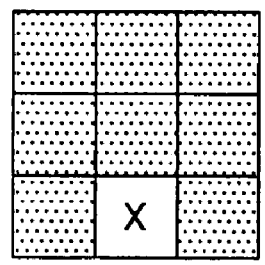
FIGS. 8A to 8C are views illustrating a post-treatment area for edge detection, an example that is detected as an edge, and a different example that is detected as a non-edge, respectively.

As is shown in FIGS. 8B and 8C, the edge-estimated pixels which are estimated as an edge as above by the halftone image detecting section are labeled "E", whereas those pixels estimated as a non-edge are labeled "N."

FIGS. 8A to 8C illustrate a post-treatment area for edge detection, an example that is detected as an edge, and a different example that is detected as a non-edge, respectively.

If the edge pixels are estimated as above, the edge detecting section 20 shown in FIG. 1 removes the edge-estimated pixels from the halftone image area, and executes the erosion and the dilation procedures to compensate those pixels estimated as a non-edge in an actual edge area such as a text. Through this process, the edge is finally detected.

That is, FIG. 8A illustrates a post-treatment area for edge detection, FIG. 8B illustrates an example that is detected as an edge via the dilation procedure, and FIG. 8C illustrates an example that is detected as a non-edge via the erosion procedure.

As is shown in FIG. 8A, x is a target pixel for emphasizing the edge. FIGS. 8B and 8C illustrate two examples, in which those pixels sorted as an edge by the edge sorting section are labeled E and other pixels are labeled N.

As for 9 pixels as in FIGS. 8A to 8C, the number of the edge-estimated pixels E is the same as the predetermined number.

If the number of the edge-estimated pixels E is at least the predetermined number n, the pixels are finally judged as an edge. Otherwise, the pixels are finally judged as a non-edge. For example, as is shown in FIG. 8B, if the edge-estimated pixel number E is at least the predetermined number n (for example n is 6), the edge-estimated pixels are finally detected as an edge. However, those pixels in FIG. 8C are finally detected as a non-edge.

Saturation information is used in the final edge detection. The saturation values of the current pixels are compared with the predetermined saturation reference value and different number reference values of Es are applied to finally determine the edge. Herein the saturation values are used to judge whether the corresponding pixels have any color in case of a colorful input picture.

That is, if the saturation values of the pixels are larger than the saturation reference value, the edge detecting section 20 judges whether the number of the edge-estimated pixels E is larger than the predetermined reference number of Es.

If the number of the edge-estimated pixels is larger than the predetermined reference number of Es, the corresponding pixels are judged as a final edge. Otherwise, the corresponding pixels are not judged as a final edge.

In the meantime, if the saturation values of the pixels are smaller than or equal to the saturation reference value and the number of the edge-estimated pixels E is larger than the reference number, the corresponding pixels are finally judged as an edge. If the saturation values of the pixels are smaller than or equal to the saturation reference value and the number of the edge-estimated pixels E is smaller than the reference value, the corresponding pixels are not judged as a final edge.

Upon the final detection of pixels as an edge by the edge detecting section 20, the edge emphasizing section 30 emphasizes the edge pixels. That is, the edge emphasizing section emphasizes the edge by applying the edge emphasizing filter such as the Unshaping Masking to the finally detected edge pixels, and outputs its result. Those pixels detected as a non-edge are outputted as they are.

With respect to a pixel detected as an edge, if the saturation value of a target pixel is larger than the saturation reference value (that is, if a color component exists more or less), the level of edge emphasis is reduced compared to another edge pixel having a saturation value smaller than the saturation reference value. This is to prevent any distortion of image quality that may be originated from strong edge emphasis in the event of a large saturation value. According to the embodiment, the saturation reference value has the same value as that compared in the edge detecting section 20.

Hereinafter an image quality improving method corresponding to the operation of the image quality improving apparatus as described above will be described with reference to FIG. 9.

Figure 9:
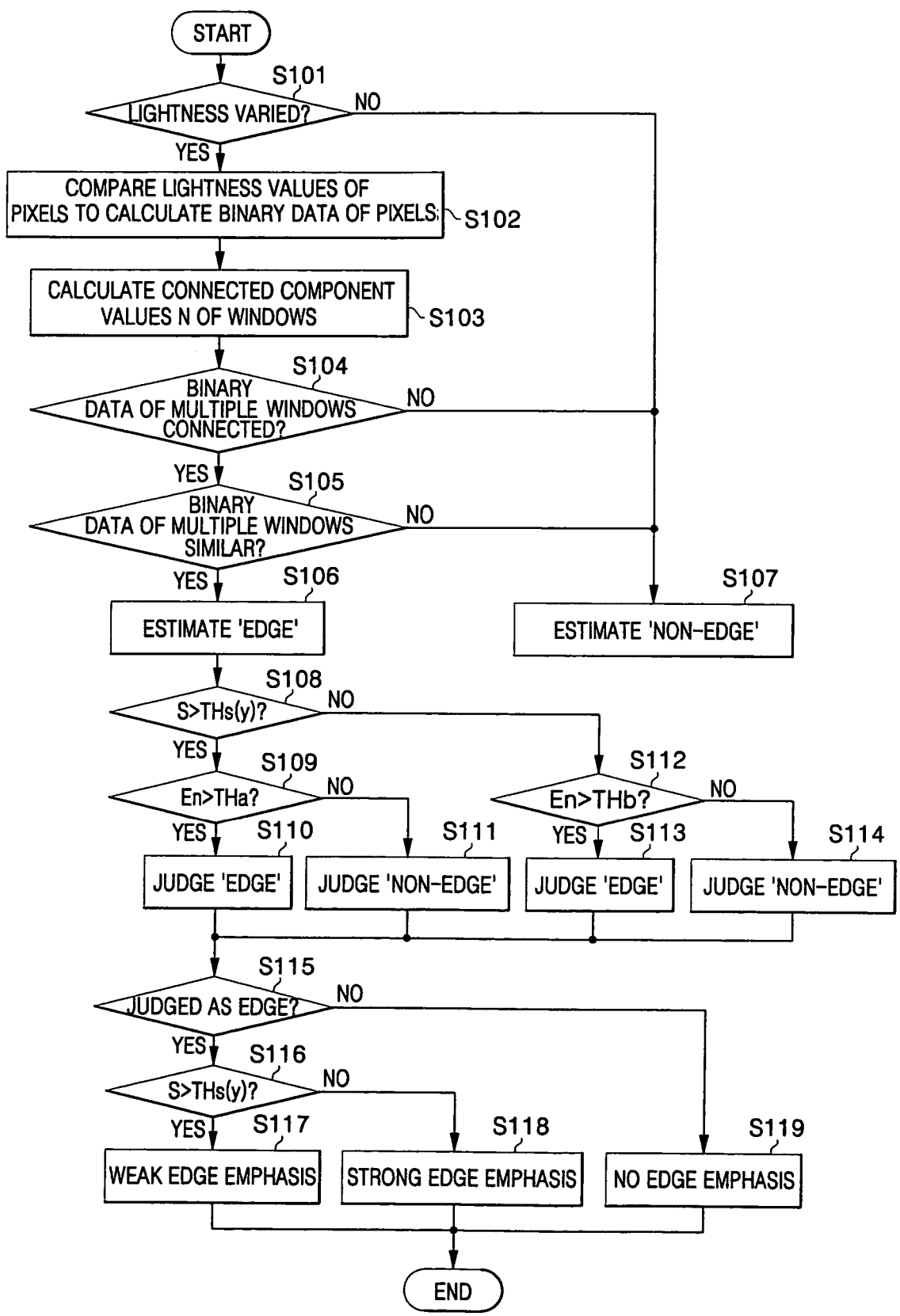
FIG. 9 is a process flowchart illustrating a method of improving image quality according to an embodiment of the invention.

FIG. 9 is a process flowchart illustrating a method of improving image quality.

As is shown in FIG. 9, lightness variation judgment is executed on pixels within a predetermined detection area in which edge detection is to be made with respect to an input picture in operation S101. That is, a reference lightness value is preset, and the differences d between the maximum and minimum lightness values of the individual pixels are compared with the predetermined reference lightness value to judge whether the individual pixels show lightness variation.

If the difference d between the maximum and minimum lightness values of a pixel is smaller than the predetermined reference lightness value, it is judged that the lightness of the pixel is not varied, and it is judged that the pixel is a non-edge in operation S107.

On the contrary, if the difference d between the maximum and minimum lightness values of a pixel is larger than the predetermined reference lightness value, it is judged that the lightness of the pixel is varied.

If the individual pixels show lightness variation in operation S101, the lightness values of the individual pixels are compared with one another to calculate binary data of the individual pixels in operation S102.

Briefly describing the binary data calculation for the individual pixels since it is described hereinbefore, if the lightness value of a pixel in text and image areas is smaller than the predetermined reference lightness value, a binary data "1" is generated. If the lightness value is larger than the predetermined reference value, a binary data "0" is generated.

Upon the generation of the binary data of the individual pixels, the binary data connected component value of multiple windows is calculated based upon the obtained binary data in operation S103.

That is, upon the calculation of the binary data for the individual pixels in the text and halftone image areas, the binary data are grouped according to the continuity of the calculated binary data. According to one embodiment, the grouping is executed based upon only four directions, including vertical and lateral directions, and without consideration of diagonal directions. That is, the binary data of a pixel is compared with that of a neighboring pixel in any of the four directions, and they are judged connected and grouped together only if their binary data are the same. Then, the number of the grouped pixels is calculated (as the connected component value).

Upon the calculation of the individual connected component values for individual multiple windows in the text and halftone image areas, it is judged whether the multiple windows have connectedness based upon the calculated connected component values in operation S104.

If all the connected component values of the individual multiple windows in the text and halftone image areas are the same (for example, all the connected component values of the multiple windows satisfy "1"), it is judged that the binary data of the individual multiple windows have connectedness. Otherwise, it is judged that the binary data of the individual multiple windows do not have connectedness, and that a corresponding pixel is a non-edge in operation S107.

For example, if all connected component values are 1 as in FIGS. 5F to 6H, it is judged that all the binary data of multiple windows have connectedness in a text area. If all connected component values are not 1 as in FIGS. 6F to 6H, it is judged that the binary data of multiple windows do not have connectedness, and that a corresponding pixel is a non-edge.

If the individual binary data of the multiple windows are judged to have connectedness, it is judged whether the binary data of the multiple windows have similarity in operation S105.

If it is judged that the binary data of the multiple windows have similarity, it is estimated that a corresponding pixel is an edge in operation S106. Otherwise, it is estimated that the corresponding pixel is a non-edge in operation S107. According to one embodiment, Equation 1 above is used to judge whether the binary data values of the multiple windows have similarity. The similarity judgment based upon Equation 1 above will not be described further since it was already described in detail hereinbefore.

Those pixels which are estimated as an edge are labeled with a letter, for example, "E", as is seen in FIGS. 8B and 8C, but those pixels which are not estimated as an edge are labeled with another letter, for example "N."

Saturation values are calculated from the pixels E that are estimated as an edge, and the calculated saturation values are compared with a predetermined saturation reference value THS(y) in operation S108. The saturation values about the edge-estimated pixels are calculated to judge whether the edge-estimated pixels have a color or not. According to one embodiment, the saturation value calculation is executed according to Equations 2 and 3 below. The RGB values of the edge-estimated pixels are converted into lightness and saturation values. R, G and B are converted into Y, Cb and Cr, in which Y is used to indicate lightness, and Cb and Cr are used to process a saturation value S. In more detail, R, G and B are converted into Y, Cb and Cr according to Equation 2 below, and the saturation value S is processed according to Equation 3 below:

$Y=(0.299828*R)+(0.586914*G)+(0.113281*B)$ $Cb=(-0.167969*R)-(0.331055*G)+(0.5*B)$ $Cr=(0.5*R)-(0.417969*G)-(0.0810547*B)$ Equation 2

$S=\sqrt{C_b{}^2+C_r{}^2}$ or $S=|C_b|+|C_r|$ Equation 3

Upon the comparison of the saturation values S of the edge-estimated pixels with the predetermined saturation reference value THS(y) according to Equation 3 above, if the saturation values S are larger than the predetermined saturation reference value THS(y), the number of the edge-estimated pixels En is compared with a predetermined first reference number THa in operation S109.

If it is judged that the number of the edge-estimated pixels En is larger than the predetermined first reference number THa, the edge-estimated pixels are judged to be an edge in operation S110. Otherwise, it is judged that the edge-estimated pixels are a non-edge in operation S111.

In the meantime, in operation S108, if the saturation values S of the edge-estimated pixels are the same as or smaller than the predetermined saturation reference value THS(y), the number of the edge-estimated pixels En is compared with a predetermined second reference value THb in operation S112.

If the number of the edge-estimated pixels En is larger than the predetermined second reference value THb, the edge-estimated pixels are judged to be an edge in operation S113. Otherwise, the edge-estimated pixels are judged to be a non-edge in operation S114. Edge emphasis is not executed to the non-edge pixels in operation S119, but rather, only to the pixels judged as an edge.

In operation S116, the saturation values S of the pixels, which are judged as an edge through the above process, are compared again with the predetermined saturation reference value THS(y) to execute edge emphasis to the pixels which are judged as an edge through the above process. The saturation values S are compared again with the predetermined saturation reference value THS(y) to execute edge emphasis at difference levels according to the saturation values S.

As a result of the comparison in operation S116 above, if the saturation value S of a given pixel that is judged as an edge is smaller than or equal to the predetermined saturation reference value THS(y), the edge emphasis is executed according to a predetermined first edge emphasis coefficient in operation S118. If the saturation value S of a given pixel that is judged as an edge is larger than the predetermined saturation reference value THS(y), the edge emphasis is executed according to a predetermined second edge emphasis coefficient in operation S117. The predetermined first edge emphasis coefficient indicates strong edge emphasis, but the predetermined second edge emphasis coefficient indicates weaker edge emphasis. That is, the first edge emphasis coefficient is larger than the second edge emphasis coefficient.

This operation (S116) is executed to prevent any distortion in the image quality that may occur when strong edge emphasis is executed on the edge pixels having large saturation values.

As set forth above, the image quality improving apparatus and method of the present invention can separately detect an edge, which is a non image boundary, appearing in an image area of a printing object produced through a dither pattern from a picture inputted via the image input unit, to prevent image quality degradation induced from a high frequency filter while emphasizing boundaries of a text or a thin line without any loss, to acquire a final picture of improved quality.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image quality improving apparatus comprising:
   a first unit estimating edge pixels of a text area in a predetermined detection area to be edge-detected from an input picture data containing a text and an image; and
   a second unit judging actual edge pixels based upon a number of edge-estimated pixels in a multiple window area and saturation values of individual edge-estimated pixels, and emphasizing individual actual edge pixels with different edge emphasis coefficients according to saturation values of the respective actual edge pixels
   wherein the first unit comprises:
       a lightness variation measuring section measuring lightness variation from individual pixels in the predetermined detection area to be edge-detected; and
       an edge estimating section calculating binary data of the individual pixels from multiple windows collectively, the binary data being composed by the lightness variation measuring section according to different sampling procedures composing the multiple windows from an area having lightness variation, the edge estimating section also judging connectedness and similarity of the calculated binary data according to the individual windows, to estimate whether a given pixel is an edge.

2. The image quality improving apparatus according to claim 1, wherein the edge estimating section estimates a given pixel as a non-edge if the lightness variation is less than a predetermined lightness variation reference value, connected component values of the binary data do not have connectedness, or windows do not have similarity.

3. The image quality improving apparatus according to claim 1, wherein the windows do not have similarity if connected component values of individual windows are not the same.

4. The image quality improving apparatus according to claim 1, wherein the second unit comprises:
   an edge detecting section performing a first comparison, comprising comparing the saturation values of the individual edge-estimated pixels of multiple windows and the number of the edge-estimated pixels with a predetermined reference saturation value and a reference estimation number, respectively, to judge whether the edge-estimated pixels are actual edge pixels or not, based upon a result of the first comparison; and
   an edge emphasizing section performing a second comparison, comprising comparing the saturation values of the actual edge pixels with the predetermined reference saturation value to execute edge emphasis on the individual pixels using different edge emphasis coefficients according to a result of the second comparison.

5. The image quality improving apparatus according to claim 4, wherein the edge detecting section judges the edge-estimated pixels as actual edge pixels if the saturation values of the individual edge-estimate pixels are larger than the predetermined reference saturation value and the number of the edge-estimated pixels is larger than a predetermined first reference edge number, and judges the edge-estimate pixels as not being actual edge pixels if the saturation values of the individual edge-estimate pixels are smaller than or equal to the predetermined reference saturation value and the number of the edge-estimated pixels is smaller than or equal to the predetermined first reference edge number.

6. The image quality improving apparatus according to claim 4, wherein:
   a first pixel edge emphasis coefficient is applied to a given actual edge pixel when the saturation value of the given actual edge pixel is larger than the predetermined reference saturation value;
   a second pixel edge emphasis coefficient is applied to a given actual edge pixel when the saturation value of the given actual edge pixel is smaller than the predetermined reference saturation value; and
   the second pixel edge emphasis coefficient is larger than the first pixel edge emphasis coefficient.

7. An image quality improving method, comprising the operations of:
   estimating edge pixels of a text area in a predetermined detection area, using at least one processing device, to be edge-detected from an input picture data containing a text and an image;
   judging actual edge pixels based upon a number of edge-estimated pixels in a multiple window area and saturation values of individual edge-estimated pixels; and
   emphasizing individual actual edge pixels with different edge emphasis coefficients according to saturation values of the actual edge pixels
   wherein the edge pixel estimating operation comprises:
      measuring lightness variation from individual pixels in the predetermined detection area to be edge-detected; and
      calculating binary data of the individual pixels according from multiple windows collectively, the binary data being composed according to different sampling procedures composing the multiple windows from an area having lightness variation, and judging connectedness and similarity of the calculated binary data according to the individual windows, to estimate whether a given pixel is an edge.

8. The image quality improving method according to claim 7, wherein the edge pixel estimating operation comprises:
   estimating a given pixel as a non-edge if the lightness variation is less than a predetermined reference value, connected component values of the binary data do not have connectedness, or windows do not have similarity.

9. The image quality improving method according to claim 8, wherein according to a result of the lightness variation measuring operation, windows do not have similarity if connected component values of individual windows are not the same.

10. The image quality improving method according to claim 7, wherein the different sampling procedures are at least one selected from a group consisting of 5×5, 5×7, and 5×9 window mask sampling procedures.

11. The image quality improving method according to claim 7, wherein the edge emphasizing operation comprises:
   in a first comparison, comparing the saturation values of the individual edge-estimated pixels of multiple windows and the number of the edge-estimated pixels with a predetermined reference saturation value and a reference estimation number, respectively, to judge whether the edge-estimated pixels are the actual edge pixels or not, based upon a result of the first comparison; and
   in a second comparison, comparing the saturation values of the actual edge pixels with the predetermined reference saturation value to emphasize the individual actual edge pixels using different edge emphasis coefficients according to a result of the second comparison.

12. The image quality improving method according to claim 11, wherein the actual pixel judging operation comprises:
   judging the edge-estimated pixels as actual edge pixels if the saturation values of the individual edge-estimated pixels are larger than the predetermined reference saturation value and the number of the edge-estimated pixels is larger than a predetermined first reference edge number; and
   judging the edge-estimated pixels as not being actual edge pixels if the saturation values of the individual edge-estimated pixels are smaller or equal to than the predetermined reference saturation value and the number of the edge-estimated pixels is smaller than or equal to the predetermined first reference edge number.

13. The image quality improving method according to claim 11, wherein the edge emphasizing operation further comprises:
   emphasizing a given actual edge pixel with a first edge emphasis coefficient if the saturation value of the given actual edge pixel is larger than the predetermined reference saturation value; and
   emphasizing a given actual edge pixel with a second edge emphasis coefficient if the saturation value of the given actual edge pixel is smaller than or equal to the predetermined reference saturation value.

14. The image quality improving method according to claim 13, wherein the first edge emphasis coefficient is smaller than the second edge emphasis coefficient.

15. An image quality improving method, comprising:
   estimating whether pixels within a detection area of an input picture are edges, using at least one processing device, and using lightness variations of the pixels, to identify corresponding edge-estimated pixels;

judging whether the edge-estimated pixels are edges using pixel saturation values and a number of edge-estimated pixels; and applying a plurality of edge emphasis coefficients to edge-judged pixels in accordance with respective saturation values of the edge-judged pixels, wherein the estimating whether the pixels within the detection area of the input picture are edges using lightness variations of the pixels comprises:

for each pixel having a lightness value variation exceeding a predetermined reference lightness variation value, comparing respective lightness differences of surrounding pixels to calculate binary data representing a given pixel with varied lightness and the surrounding pixels;

using the binary data, calculating a binary data connected component for each of multiple windows collectively, the multiple windows representing surrounding pixel sample sizes, and being centered on the given pixel with varied lightness;

determining whether the multiple windows have a connectedness using the respective binary data connected components;

for windows determined to have connectedness, determining whether the windows have similarity; and for windows determined to have similarity, estimating the given pixel with varied lightness to be an edge.

16. The method according to claim 15, wherein the determining whether the windows have similarity comprises:

determining whether the binary data of the multiple windows satisfies the following equation $$\sum_{i=1}^{3}\sum_{j=1}^{3} a_{ij}b_{ij}c_{ij} \geq TH_a$$

wherein $a_{ij}$, $b_{ij}$, and $c_{ij}$ are the binary data values of multiple windows, respectively, and $TH_a$ is a predetermined reference value.

17. The method according to claim 15, wherein the judging whether the edge-estimated pixels are edges using the pixel saturation values and the number of edge-estimated pixels comprises:

judging a given edge-estimated pixel to be an edge if the saturation value of the given edge-estimated pixel exceeds a predetermined saturation reference value and the number of edge-estimated pixels exceeds a first reference number; and judging the given pixel to be an edge if the saturation value of the given edge-estimated pixel does not exceed the predetermined saturation reference value and the number of edge-estimated pixels exceeds a second reference number.

18. The method according to claim 15, wherein the applying the plurality of edge emphasis coefficients to the edge-judged pixels in accordance with the respective saturation values of the edge-judged pixels comprises:

applying edge emphasis to a given edge judged pixel using a first predetermined edge emphasis coefficient if the saturation value of the given edge-judged pixel does not exceed a predetermined saturation reference value; and applying edge emphasis to the given edge judged pixel using a second predetermined edge emphasis coefficient if the saturation value of the given edge-judged pixel exceeds the predetermined saturation reference value, the first predetermined edge emphasis coefficient being greater than the second predetermined edge emphasis coefficient.

19. The method according to claim 15, wherein the respective saturation values of the edge-estimated pixels are determined using the following equations:

$Cb = (-0.167969*R) - (0.331055*G) + (0.5*B);$ $Cr = (0.5*R) - (0.417969*G) - (0.0810547*B);$ and $S = |C_b| + |C_r|,$ wherein R, G, and B are red, green, and blue values, respectively, of a given edge-estimated pixel, and S is the saturation value of the given edge-estimated pixel.

20. An image quality improving apparatus, comprising:

an edge sorting section estimating whether pixels within a detection area of an input picture are edges using lightness variations of the pixels, to identify corresponding edge-estimated pixels;

an edge detecting section judging whether the edge-estimated pixels are edges using pixel saturation values and a number of edge-estimated pixels; and an edge emphasizing section applying a plurality of edge emphasis coefficients to edge-judged pixels in accordance with respective saturation values of the edge-judged pixels, wherein the edge sorting section comprises:

a lightness variation measuring section determining whether lightness value variations of pixels within the detection area exceed a predetermined reference lightness variation value; and a halftone image detecting section comparing respective lightness differences of surrounding pixels, for each pixel having a lightness value variation exceeding the predetermined reference lightness variation value, to calculate binary data representing a given pixel with varied lightness and the surrounding pixels, using the binary data, calculating a binary data connected component for each of multiple windows collectively, the multiple windows representing surrounding pixel sample sizes and being centered on the given pixel with varied lightness, determining whether the multiple windows have a connectedness using the respective binary data connected components, for windows determined to have connectedness, determining whether the windows have similarity, and for windows determined to have similarity, estimating the given pixel with varied lightness to be an edge.

21. The image quality improving apparatus according to claim 20, wherein the determining whether the windows have similarity comprises:

determining whether the binary data of the multiple windows satisfies the following equation $$\sum_{i=1}^{3}\sum_{j=1}^{3} a_{ij}b_{ij}c_{ij} \geq TH_a$$

wherein $a_{ij}$, $b_{ij}$, and $c_{ij}$ are the binary data values of multiple windows, respectively, and $TH_a$ is a predetermined reference value.

22. The image quality improving apparatus according to claim 20, wherein:

the edge detecting section judges a given edge-estimated pixel to be an edge if the saturation value of the given edge-estimated pixel exceeds a predetermined saturation reference value and the number of edge-estimated pixels exceeds a first reference number, and judges the given pixel to be an edge if the saturation value of the given edge-estimated pixel does not exceed the predetermined saturation reference value and the number of edge-estimated pixels exceeds a second reference number.

23. The image quality improving apparatus according to claim 20, wherein:

the edge emphasizing section applies edge emphasis to a given edge judged pixel using a first predetermined edge emphasis coefficient if the saturation value of the given edge-judged pixel does not exceed a predetermined saturation reference value, and applies edge emphasis to the given edge judged pixel using a second predetermined edge emphasis coefficient if the saturation value of the given edge-judged pixel exceeds the predetermined saturation reference value, the first predetermined edge emphasis coefficient being greater than the second predetermined edge emphasis coefficient.

24. The image quality improving apparatus according to claim 20, wherein the edge emphasizing section determines the respective saturation values of the edge-estimated pixels using the following equations:

$$Cb = (-0.167969 * R) - (0.331055 * G) + (0.5 * B);$$

$$Cr = (0.5 * R) - (0.417969 * G) - (0.0810547 * B); \text{ and}$$

$$S = |C_b| + |C_r|,$$

wherein R, G, and B are red, green, and blue values, respectively, of a given edge-estimated pixel, and S is the saturation value of the given edge-estimated pixel.

* * * * *